United States Patent
Hedtke et al.

(10) Patent No.: US 7,490,516 B2
(45) Date of Patent: Feb. 17, 2009

(54) MANUAL POWERED PROCESS TRANSMITTER

(75) Inventors: Robert Hedtke, Young America, MN (US); Richard L. Nelson, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/339,891

(22) Filed: Jan. 26, 2006

(65) Prior Publication Data
US 2007/0169574 A1  Jul. 26, 2007

(51) Int. Cl.
*G01D 11/24* (2006.01)

(52) U.S. Cl. ........................................ 73/431

(58) Field of Classification Search ........................ None
See application file for complete search history.

(56) References Cited

U.S. PATENT DOCUMENTS

| | | | |
|---|---|---|---|
| 4,105,314 A | | 8/1978 | Hughes, Jr. |
| 4,165,500 A | * | 8/1979 | Misawa ........................ 334/86 |
| 4,220,907 A | * | 9/1980 | Pappas et al. ................ 322/3 |
| 4,227,092 A | | 10/1980 | Campagnuolo et al. |
| 4,360,860 A | | 11/1982 | Johnson et al. |
| 4,788,617 A | * | 11/1988 | Davidson ........................ 361/1 |
| 4,837,494 A | * | 6/1989 | Maier ............................. 322/1 |
| 4,969,209 A | * | 11/1990 | Schwob .................... 455/158.4 |
| 5,552,973 A | | 9/1996 | Hsu |
| 6,034,492 A | * | 3/2000 | Saito et al. ................... 318/141 |
| 6,239,501 B1 | * | 5/2001 | Komarechka ............... 290/1 R |
| 6,258,265 B1 | * | 7/2001 | Jones ........................... 210/202 |
| 6,288,463 B1 | * | 9/2001 | Tada et al. ................... 310/75 B |
| 6,563,269 B2 | | 5/2003 | Robinett et al. |
| 6,789,926 B2 | | 9/2004 | Chang |
| 6,930,403 B2 | * | 8/2005 | Hartman et al. ............. 290/1 A |
| 2004/0150230 A1 | * | 8/2004 | Hartman et al. ............. 290/1 R |
| 2005/0279679 A1 | | 12/2005 | Baarman |
| 2005/0284417 A1 | * | 12/2005 | Jezl ............................ 119/850 |

FOREIGN PATENT DOCUMENTS

| | | |
|---|---|---|
| GB | 2 279 536 A | 1/1995 |
| JP | 08292078 | * 11/1996 |

OTHER PUBLICATIONS

Martin, "A Smarte4r Approach to Resolving Power-Line Noise", Transmission & Distribution World, Sep. 2004.*
BPL Testing, IBC Systems installed at CVEC in Nelson County (VA), Jan. 2005.*
Article by Moyers, et al. "*Harvesting Energy with Hand-Crank Generators to Support Dismounted Soldier Missions*", US Army RDECOM CERDEC Power Generation Branch, pp. 1-8.
"*Electricity Work Scheme—Project*", http://www.eng.uct.ac.za/~victor/electric/Genny.htm, pp. 1-9, Aug. 3, 2005.
Article by Fischelli. "*How Generators Work; How to Test Them*", *AutoInc. Magazine*, vol. L111, pp. 1-4, Apr. 2005.
Castlewood Scientific Demonstration Products, http://castlewood1.com/20019.html, pp. 1-3, Aug. 30, 2005.

* cited by examiner

*Primary Examiner*—Robert R Raevis
(74) *Attorney, Agent, or Firm*—Kinney & Lange, P.A.

(57) ABSTRACT

A process transmitter includes a manually operated power generator to provide electrical power to sense a process variable, produce an output based on the sensed process variable, and provide a display of the output.

23 Claims, 5 Drawing Sheets

Fig. 5

MANUAL POWERED PROCESS TRANSMITTER

BACKGROUND OF THE INVENTION

This invention relates generally to process instruments used in industrial process control systems. More particularly, the present invention relates to a process transmitter having a modular, manually operated power generator.

Process transmitters are used to monitor process variables, such as pressure, temperature, flow and level, of process fluids used in industrial processes. For example, process transmitters are widely used in the chemical manufacturing and oil refining industries. Process transmitters are typically employed throughout industrial facilities at multiple locations to monitor a variety of process variables. Additionally, process transmitters are used in isolated field locations such as in cross-country pipelines.

Process transmitters include sensors that produce an electrical output in response to physical changes in the process variable. For example, capacitive pressure transducers or piezoresistive pressure transducers produce an electrical output as a function of the pressure of a process fluid. The electrical output of the sensor is processed by the transmitter circuitry so it can be monitored as an indication of pressure of the process fluid. Process transmitters also include electronics for either remotely or locally monitoring the electrical output. Remotely monitored transmitters include electronics that transmit the electrical output over a control loop or network to a central monitoring location such as a control room. Locally monitored transmitters include displays, such as LCD screens, that show the electrical output at the site of the process transmitter. Process transmitters typically draw their power through the control loop or network, or through power delivered through wiring systems typically found in industrial settings. In other embodiments, process transmitters include components for both local and remote monitoring.

However, in process transmitters that are located at extremely remote locations, such as on cross-country pipelines or oil and gas wells, it may be impracticable to directly deliver power to the process transmitter through either a control loop or wiring system. Nonetheless, it is necessary to have intermittent process transmitters situated along the pipeline in order to permit direct monitoring of the process fluid at the remote location.

Batteries and solar power have been the traditional method of delivering power to remotely located process transmitters. Conventional process transmitters include a terminal block for receiving the wiring associated with the control loop or power wiring systems. The terminal block is located within the housing of the process transmitter and includes terminals for receiving and securing the wires used to deliver the power. Typically the terminals are accessible from the exterior of the process transmitter housing through a conduit opening. The terminal block is connectable with power connectors inside the process transmitter housing that distribute power to the process transmitter electronics and sensor. Terminal blocks are modular and are easily removed from the process transmitter and replaced. A battery or a solar panel can also be coupled to the terminal block. Batteries eventually become fully discharged and therefore can be unreliable in field environments where replacement batteries are not readily available. Also, bringing replacement batteries into the field is burdensome even when they are available. Solar power can also be an unreliable source of energy due to unfavorable weather conditions that does not produce enough light to operate the transmitter.

BRIEF SUMMARY OF THE INVENTION

A process transmitter includes a sensor, transmitter electronics and a manually operated power generator. The sensor measures a process variable and generates a process variable signal. The transmitter electronics condition the process variable signal. The manually operated power generator supplies power to the sensor and the transmitter electronics.

DETAILED DESCRIPTION

Figure 1:
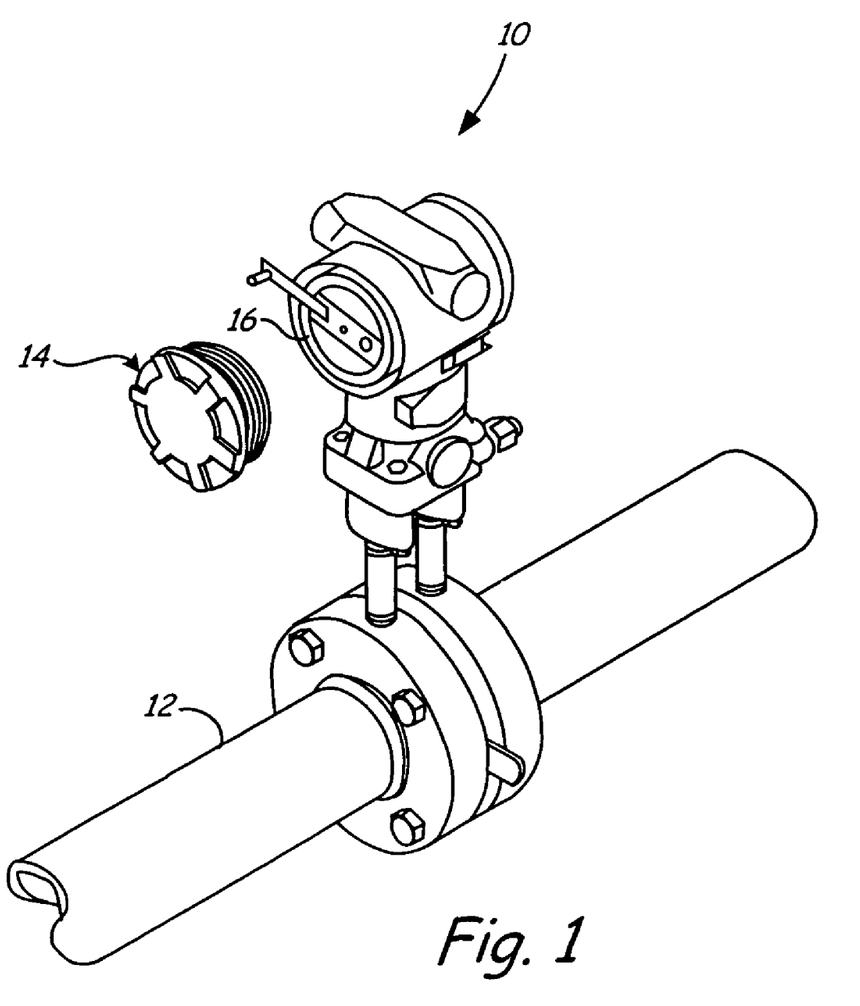
FIG. 1 shows a partially exploded view of remotely located manual powered process transmitter in which the present invention is used.

FIG. 1 shows manual powered process transmitter 10 installed on a remotely situated process fluid source, such as pipeline 12. Process transmitter 10 is shown with cap 14 removed to show manually operated power generator 16. Process transmitter 10 includes a sensing apparatus for measuring a process variable such as temperature, pressure, flow and level of the process fluid. Process transmitter 10 includes electronics that convert the output of the sensing apparatus to a format that can be indicated on a display integral with process transmitter 10, on a handheld field communicator device, or on computer terminals in communication with a control loop. In order for the sensing apparatus and the electronics to operate, it is necessary to provide process transmitter 10 with power. Pipeline 12 is representative of a typical field application of process transmitter 10 in which power is not readily deliverable from a power grid or other such source. Since process transmitter 10 is located at a remote location where external power is not readily available, process transmitter 10 is supplied with manually operated power generator 16.

Figure 2:
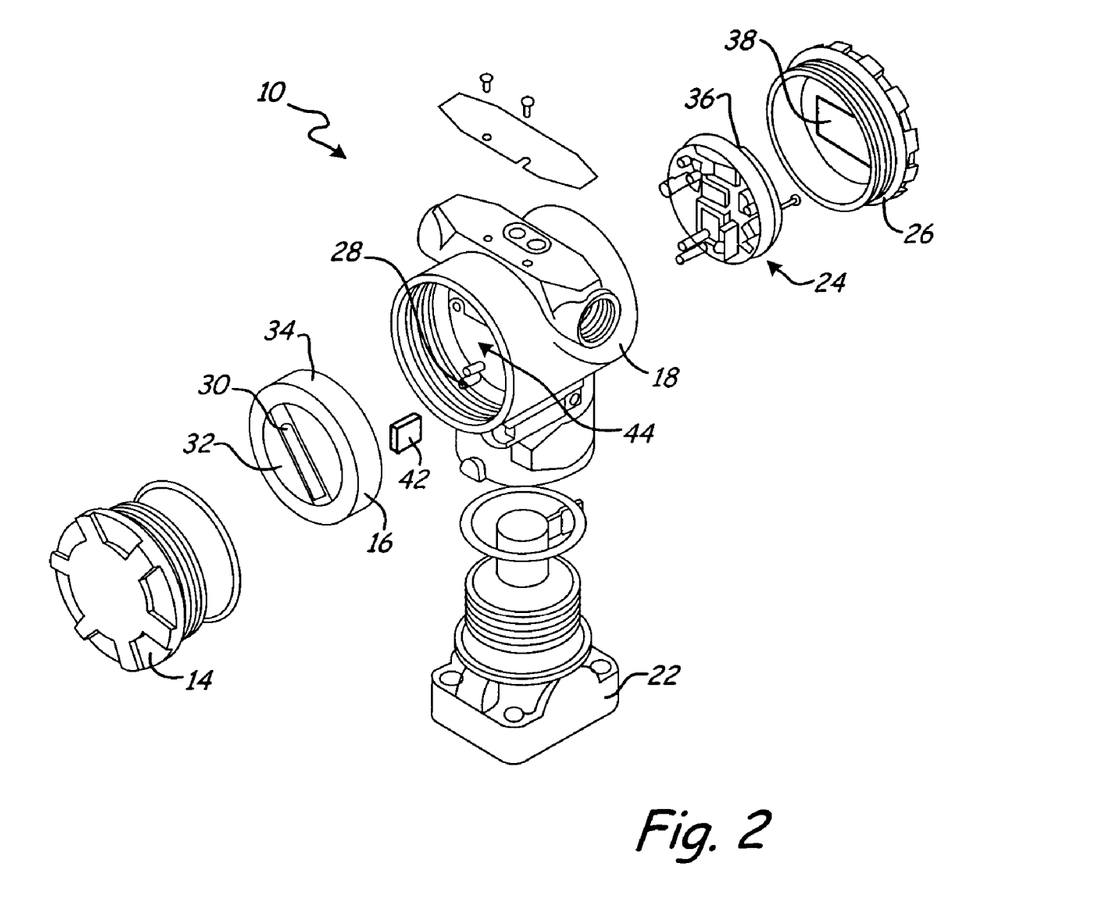
FIG. 2 shows an exploded view of the process transmitter of FIG. 1.

FIG. 2 shows an exploded view of one embodiment of manual powered process transmitter 10 having manually operated power generator 16 of the present invention. Process transmitter 10 includes cap 14, manually operated power generator 16, housing 18, sensor apparatus 22, electronics 24, cap 26, and connectors 28. The energy necessary for powering sensor apparatus 22 and electronics 24 is generated by power generator 16. Power generator 16 includes crank handle 30, permanent magnet assembly 32 and wire coil assembly 34. Power generator 16 is a self-contained manually operated power generator that does not require connection to any outside power source. Power generator 16 is modular such that it is easily removed from housing 18 and replaced. Power generator 16 converts mechanical power generated by a human, or another source, to electrical power. In various embodiments of the invention, the manually operated power generator can be operated using cranking, pumping or pedaling action that can convert mechanical energy into electrical energy. In one embodiment, power generator 16 is a DC electromagnetic generator comprised of a permanent magnet and wire winding.

In the embodiment shown, sensor apparatus 22 of process transmitter 10 is a pressure sensor. In other embodiments, process transmitter 10 includes a sensor for detecting other process variables such as temperature. Sensor apparatus 22 also provides a support for mounting process transmitter 10 on pipeline 12 (shown in FIG. 1). Located on the underside of sensor apparatus 22 is a hydraulic interface for interacting with the process fluid. Sensor apparatus 22 provides an electrical output that is a function of the process variable as detected through the fluid interface. Sensor apparatus is inserted into the bottom of housing 18 and connected with electronics 24.

Electronics 24 is inserted into housing 18 so that they are linked for communication with sensor apparatus 22. Electronics 24 is also in communication with connectors 28 so that power can be supplied to electronics 24 when power generator 16 is connected with connectors 28. Electronics 24 includes circuitry for conditioning the signal generated by sensor apparatus 22 into a functional signal. Also, in one embodiment, electronics 24 include display 36 for visually displaying the signal generated by sensor apparatus 22 and electronics 24. Display 36 is located on the front side of electronics 24 is visible through cap 26 through glass plate 38. Cap 26 can be securely tightened down on housing 18. Additionally, the threads of cap 26 act as quenching channels that prevent internal flames from reaching the outside of process transmitter 10.

In one embodiment, process transmitter 10 includes supercapacitor 42 for storing energy produced by power generator 16. In a preferred embodiment, supercapacitor 42 is located in power generator 16 such that generator 16 is a complete modular assembly. This makes upgrade of field devices much simpler and also retains the intrinsic safety qualities of electronics 24. In other embodiments, supercapacitor 42 can be positioned in electronics 24. Supercapacitor 42 stores a quantity of energy, supplied by generator 16, from which sensor apparatus 22 and electronics 24 draw current as needed. In one embodiment, supercapacitor 42 is a one farad capacity, and generator 16 provides about six watts of power to supercapacitor 42. Thus, when energy is produced with generator 16, supercapacitor 42 stores enough energy to keep sensor apparatus 22 and electronics 24 operating long enough (e.g. up to about five minutes) for information to be obtained from process transmitter 10.

Power generator 16 is inserted into interior storage space 44 of housing 18 and secured to connectors 28. Connectors 28 provide an interface for supplying power generated by power generator 16 to electronics 24 and sensor apparatus 22. Connectors 28 can be any suitable means for linking power generator 16 with electronics 24, such as plugs, prongs, apertures, sockets or the like. Power generator 16 is designed to fit into interior storage space 44 of housing 18 in place of a terminal block that is traditionally found in housing 18. Connectors 28 are capable of receiving the electrical connectors located on terminal blocks such that process transmitter 10 is able to receive power from a control loop or power wiring system. Power generator 16 is also compatible with connectors 28 such that power generator 16 can supply sensor apparatus 22 and electronics 24 with power through supercapacitor 42. In the embodiment shown in FIGS. 1-5, process transmitter 10 is shown having power generator 16 in lieu of a terminal blocks.

Power generator 16 includes foldaway crank handle 30 used to turn permanent magnet assembly (or rotor) 32 inside wire coil assembly (or stator) 34. When power generator 16 is in the stowed away position, crank handle 30 is folded inside housing 18 and cap 14 is placed over power generator 16 and fastened to housing 18. A gap is left between power generator 16 and the inside of housing 18 such that rear cap 14 can interface with internal threads of housing 18.

Figure 3:
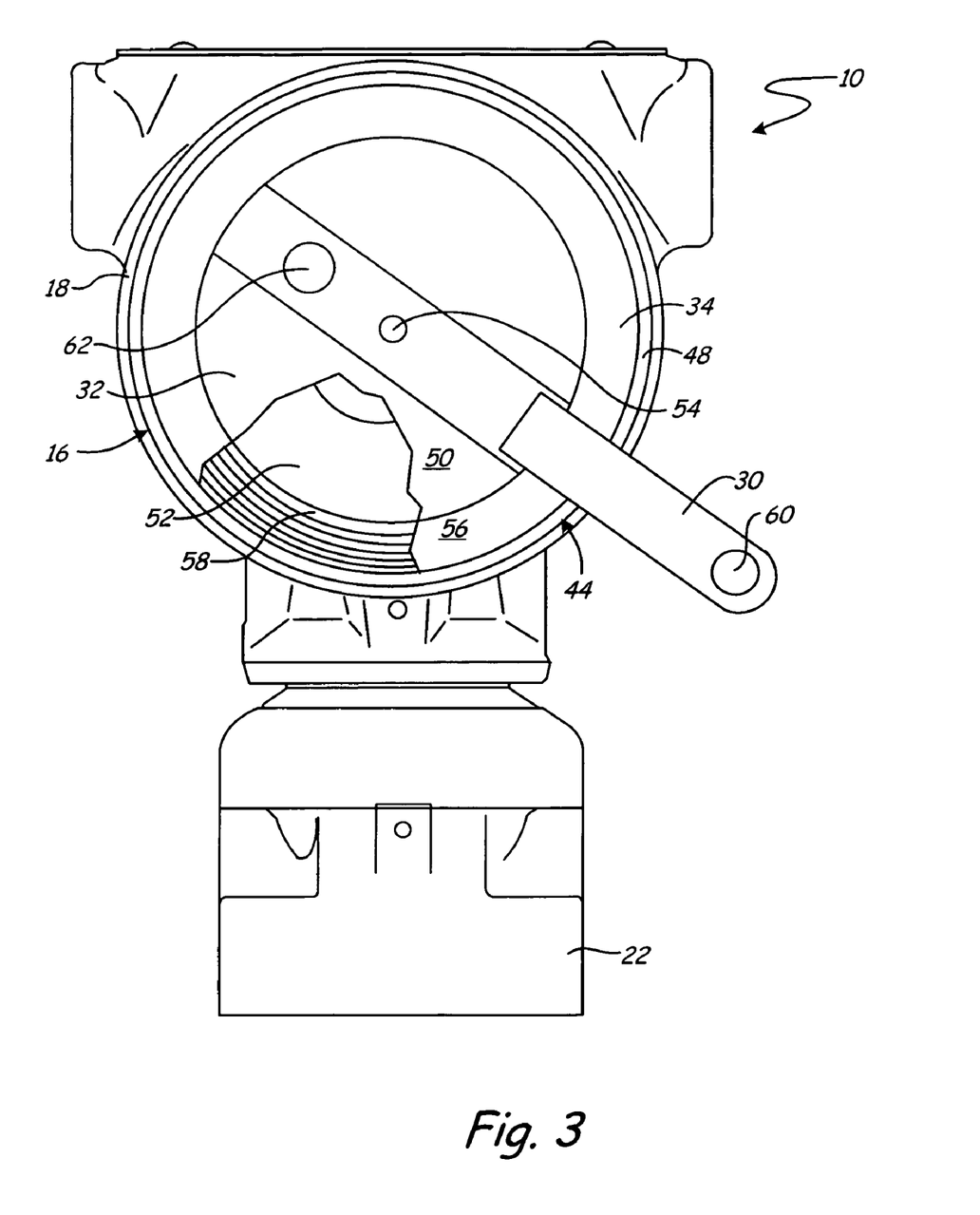
FIG. 3 shows a view of the process transmitter having a cap removed and a partially cut away manually operated power generator.

FIG. 3 shows a view of process transmitter 10 having cap 14 removed and partially cut away manually operated power generator 16. Power generator 16 includes magnetic core assembly 32 and coil winding assembly 34. Magnetic core assembly 32 includes core housing 50, magnetic core 52 and crank handle 30. Coil winding assembly 34 is comprised of winding housing 56 and coil winding 58. Core housing 50 is partially cut away to show magnetic core 52. Winding housing 56 is partially cut away to show coil winding 58.

Interior storage space 44 is configured for receiving and encapsulating power generator 16 in lieu of a terminal block. Coil winding assembly 32 is circumferentially smaller than housing 18 to allow for gap 48 to permit rear cap 14 to interface with the threads on the inside of housing 18. Magnetic core assembly 32 is rotatably fastened to coil winding assembly 34 with pin connection 54. Crank handle 30 is folded out from magnetic core housing 50 and is in the operable position. Crank handle 30 includes knob 60 that provides a means for grasping and turning core assembly 32. Core housing 50 also includes recess 62, which allows crank handle 30 and knob 60 to be tucked away inside power generator 16 in the stowed away position.

Power generator 16 is anchored in place to housing 18 by mechanical means such as screws. Magnetic core 52 is any permanent magnet suitable for use in an electromagnetic generator as is known in the art. Coil winding 58 is comprised of a single winding or multiple windings of wire strands, as is known in the art. As magnetic core 52 is rotated, a magnetic field induces a current flow in coil winding 58. In one embodiment, the current flow is regulated by a voltage regulator and transistors, as is known in the art. The current flows into supercapacitor 42, whereby it is stored for powering electronics 24, sensor apparatus 22 and display 36.

Power generator 16 supplies the means for powering sensor apparatus 22 and electronics 24 in order to operate process transmitter 10. Thus, operation of process transmitter 10 only requires that cap 14 be removed and crank handle 30 be rotated in order to deliver power to supercapacitor 42; no external power source is necessary. No special equipment is necessary to supply power to process transmitter 10. Batteries are not necessary to operate process transmitter 10.

In use, an operator can manually power a process transmitter in a remote location and then record the process measurement, either displayed on the local display or accessed by the operator through a handheld field communicator. Alternatively, the process transmitter could be equipped with a wireless transmitter so that after the operator manually powers up the transmitter, the transmitter can then wirelessly transmit the process measurement to a remotely located control system.

Figure 4:
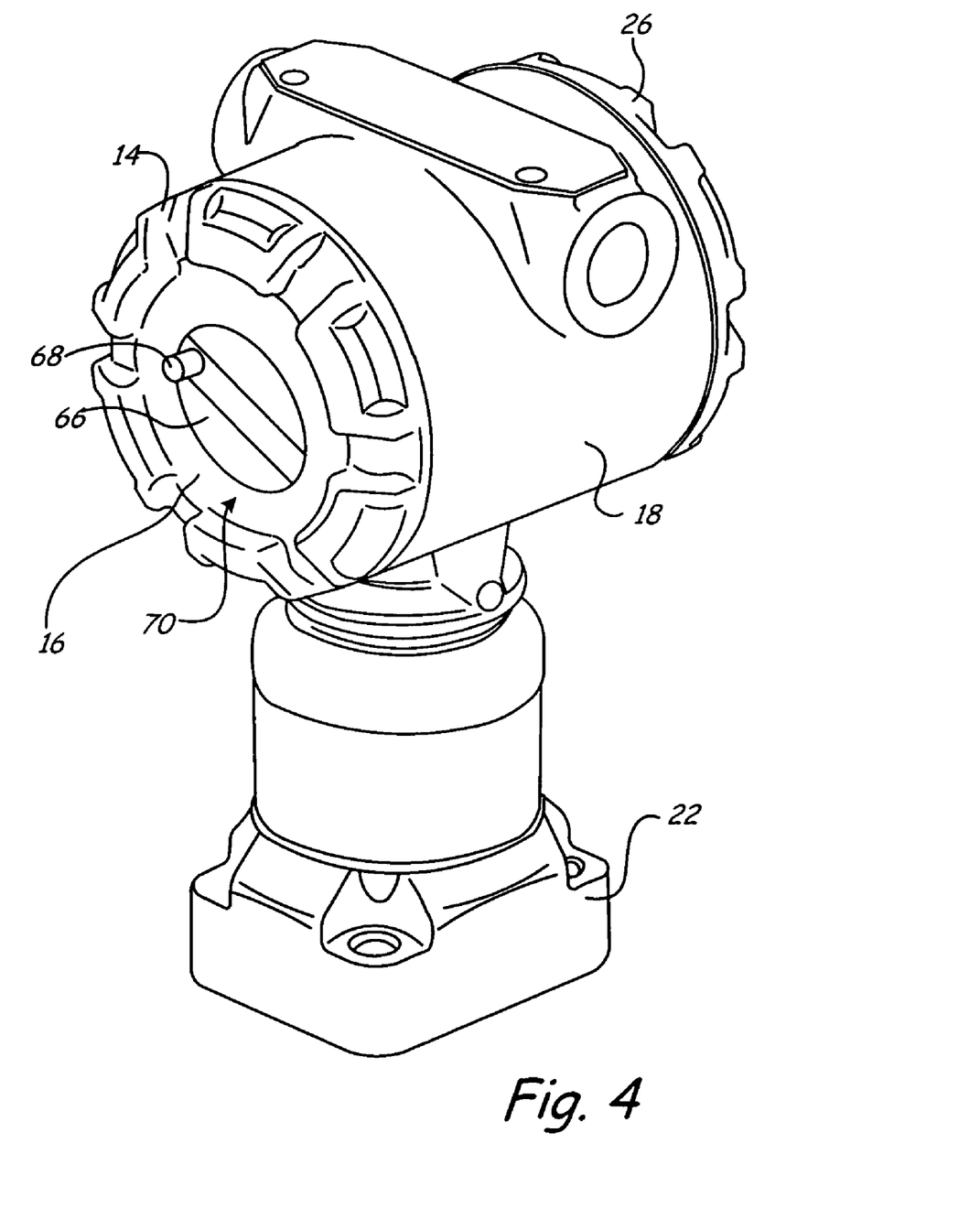
FIG. 4 shows a perspective view of another embodiment of a manual powered process transmitter in which the power generator is accessible through an opening in a cap of the process transmitter.

FIG. 4 shows a perspective view of another embodiment of manual powered process transmitter 10 in which power generator 16 is accessible through an opening in cap 14. Power generator 16 is comprised of a coil winding assembly and magnetic core assembly 66, which is rotatable inside of the coil winding assembly with handle 68. Cap 14 includes opening 70 to allow access to handle 68 without removing cap 14. In one embodiment, a barrier, such as an o-ring seal, is positioned between cap 14 and magnetic core assembly 66 in order to provide an environmental seal.

Figure 5:
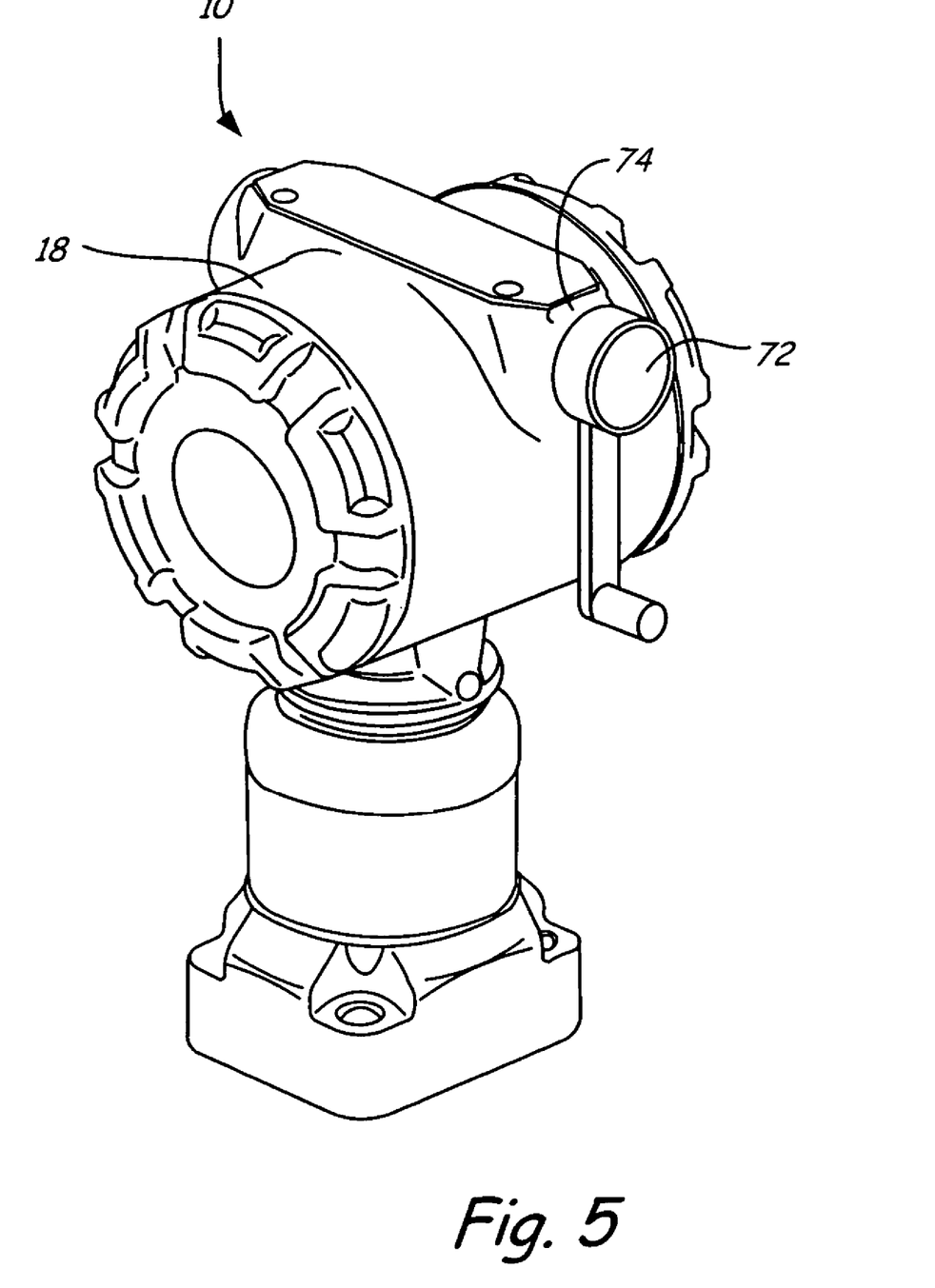
FIG. 5 shows another embodiment of a manual powered process transmitter in which a crank handle is connected with a power generator through a conduit opening.

FIG. 5 shows another embodiment of manual powered process transmitter 10 in which crank handle 72 is connected with power generator 16 through opening 74. Opening 74 provides access for wires to a terminal block traditionally located within housing 18. Opening 74 is configured for receiving conduit containing wires of a control loop or power wires. Crank handle 72 can be connected directly with power generator 16 or with a mechanical system such as a gear train. Crank handle 72 is rotated so as to turn a magnetic core with respect to a coil winding for supplying current to charge a capacitor.

Although the present invention has been described with reference to preferred embodiments, workers skilled in the art will recognize that changes may be made in form and detail without departing from the spirit and scope of the invention.

The invention claimed is:

1. An industrial process transmitter comprising:
    a housing comprising:
        an internal storage space;
        an internal power connector positioned within the internal storage space;
    a sensor for measuring an industrial process parameter selected from the group consisting of pressure, temperature, level and flow of an industrial process fluid and generating a sensor signal that is a function of the measured process parameter;
    transmitter electronics positioned within the internal storage space of the housing to connect to the internal power connector, and connected to the sensor for conditioning the sensor signal and producing a transmitter output representative of the measured process parameter, the transmitter electronics being capable of communicating with an external control loop;
    a manually driven power generator positioned within the internal storage space of the housing to connect to the internal power connector for supplying power to the sensor and the transmitter electronics through the internal power connector;
    a supercapacitor positioned within the internal storage space and connected to the transmitter electronics to store power generated by the manually driven power generator; and
    a casing for housing the manually driven power generator, the casing configured for storage in the internal storage space of the industrial process transmitter such that the manually driven power generator connects to the internal power connector.

2. The industrial process transmitter of claim 1 wherein in the control loop comprises a wireless network.

3. The industrial process transmitter of claim 1 wherein the power generator converts mechanical energy into electrical energy.

4. The industrial process transmitter of claim 1 wherein the power generator is a DC generator.

5. The industrial process transmitter of claim 1 wherein the power generator is an electromagnetic generator.

6. The industrial process transmitter of claim 1 and further comprising:
    a cap for accessing the internal storage space of the housing;
    wherein the power generator is accessible in the internal storage space of the housing by removing the cap.

7. The industrial process transmitter of claim 6 wherein the power generator includes a foldaway crank handle that collapses into the housing.

8. The industrial process transmitter of claim 1 and further comprising:
    a cap for accessing the internal storage space of the housing;
    wherein the power generator is accessible through an opening in the cap.

9. The industrial process transmitter of claim 1 and further comprising:
    a opening located on the housing for accessing the internal storage space of the housing; and
    wherein the power generator includes a crank handle in communication with the power generator through the opening.

10. The industrial process transmitter of claim 1 and further comprising:
    a display for displaying an output of the transmitter electronics.

11. An industrial process transmitter comprising:
    a transmitter housing comprising:
        an internal compartment; and
        a terminal block power connector;
    a sensor for measuring temperature, pressure, flow or level of an industrial process fluid,
    a manually operated power generator fitted within the internal compartment and connected to the terminal block power connector, wherein the manually operated power generator is for converting mechanical energy input into electrical energy output, and wherein the manually operated power generator is enclosed in a modular generator housing that facilitates linkage with the terminal block power connector and removal from the internal compartment;
    transmitter electronics disposed within the internal compartment and connected to the terminal block power connector and the sensor, the transmitter electronics being capable of communicating with an external control loop; and
    a supercapacitor disposed within the internal compartment and connected to the transmitter electronics, wherein the supercapacitor is for storing energy generated by the manually operated power generator, and wherein the electrical energy stored in the supercapacitor powers the sensor.

12. The industrial process transmitter of claim 1 wherein the sensor measures an industrial process parameter selected from the group consisting of pressure, temperature and level of the industrial process fluid. generator is a DC generator.

13. The industrial process transmitter of claim 11 wherein the power generator is an electromagnetic generator.

14. The industrial process transmitter of claim 11 and further comprising:
    a display for displaying an output of the sensor.

15. The industrial process transmitter of claim 11 and further comprising:
    a support for connecting the housing to a source of the industrial process fluid.

16. The industrial process transmitter of claim 11 and further comprising:
    a cap for accessing the internal compartment of the housing;
    wherein the power generator is accessible in the internal compartment of the housing by removing the cap.

17. The industrial process transmitter of claim 16 wherein the power generator includes a foldaway crank handle that collapses into the housing.

18. The industrial process transmitter of claim 11 and further comprising:
    a cap for accessing the internal compartment of the housing;

wherein the power generator is accessible through an opening in the cap.

19. The industrial process transmitter of claim 11 and further comprising:
an opening located on the housing for accessing the internal compartment of the housing; and
wherein the power generator includes a crank handle in communication with the power generator through the opening.

20. The industrial process transmitter of claim 18 wherein the cap is threaded onto the housing with flame quenching channels.

21. The industrial process transmitter of claim 13 and further comprising:
a cap for accessing the internal compartment of the housing;
wherein the power generator is accessible through an opening in the cap.

22. The industrial process transmitter of claim 13 and further comprising:
an opening located on the housing for accessing the internal compartment of the housing; and
wherein the power generator includes a crank handle in communication with the power generator through the opening.

23. The industrial process transmitter of claim 13 wherein the modular generator housing connects to the terminal block power connector in a repeatably removable fashion.

* * * * *

UNITED STATES PATENT AND TRADEMARK OFFICE
CERTIFICATE OF CORRECTION

| | | |
|---|---|---|
| PATENT NO. | : 7,490,516 B2 | Page 1 of 3 |
| APPLICATION NO. | : 11/339891 | |
| DATED | : February 17, 2009 | |
| INVENTOR(S) | : Robert Hedtke et al. | |

It is certified that error appears in the above-identified patent and that said Letters Patent is hereby corrected as shown below:

IN THE CLAIMS: delete Claims 1-23 and insert:

--1. An industrial process transmitter comprising:
    a housing comprising:
        an internal storage space;
        an internal power connector positioned within the internal storage space;
    a sensor for measuring an industrial process parameter selected from the group consisting of pressure, temperature, level and flow of an industrial process fluid and generating a sensor signal that is a function of the measured process parameter;
    transmitter electronics positioned within the internal storage space of the housing to connect to the internal power connector, and connected to the sensor for conditioning the sensor signal and producing a transmitter output representative of the measured process parameter, the transmitter electronics being capable of communicating with an external control loop;
    a manually driven power generator positioned within the internal storage space of the housing to connect to the internal power connector for supplying power to the sensor and the transmitter electronics through the internal power connector;
    a supercapacitor positioned within the internal storage space and connected to the transmitter electronics to store power generated by the manually driven power generator; and
    a casing for housing the manually driven power generator, the casing configured for storage in the internal storage space of the industrial process transmitter such that the manually driven power generator connects to the internal power connector.

2. The industrial process transmitter of claim 1 wherein in the control loop comprises a wireless network.

3. The industrial process transmitter of claim 1 wherein the housing further comprises:
    an interface for linking the sensor with the industrial process fluid.

Signed and Sealed this
Twelfth Day of June, 2012

David J. Kappos
*Director of the United States Patent and Trademark Office*

CERTIFICATE OF CORRECTION (continued)
U.S. Pat. No. 7,490,516 B2

4. The industrial process transmitter of claim 1 wherein the power generator converts mechanical energy into electrical energy.

5. The industrial process transmitter of claim 1 wherein the power generator is a DC generator.

6. The industrial process transmitter of claim 1 wherein the power generator is an electromagnetic generator.

7. The industrial process transmitter of claim 1 and further comprising:
    a cap for accessing the internal storage space of the housing;
    wherein the power generator is accessible in the internal storage space of the housing by removing the cap.

8. The industrial process transmitter of claim 7 wherein the power generator includes a foldaway crank handle that collapses into the housing.

9. The industrial process transmitter of claim 1 and further comprising:
    a cap for accessing the internal storage space of the housing;
    wherein the power generator is accessible through an opening in the cap.

10. The industrial process transmitter of claim 1 and further comprising:
    a opening located on the housing for accessing the internal storage space of the housing; and
    wherein the power generator includes a crank handle in communication with the power generator through the opening.

11. The industrial process transmitter of claim 1 and further comprising:
    a display for displaying an output of the transmitter electronics.

12. The industrial process transmitter of claim 1 wherein the sensor measures an industrial process parameter selected from the group consisting of pressure, temperature and level of the industrial process fluid.

13. An industrial process transmitter comprising:
    a transmitter housing comprising:
        an internal compartment; and
        a terminal block power connector;
    a sensor for measuring temperature, pressure, flow or level of an industrial process fluid, a manually operated power generator fitted within the internal compartment and connected to
        the terminal block power connector, wherein the manually operated power generator is for converting mechanical energy input into electrical energy output, and wherein the manually operated power generator is enclosed in a modular generator housing that facilitates linkage with the terminal block power connector and removal from the internal compartment;
    transmitter electronics disposed within the internal compartment and connected to the terminal block power connector and the sensor, the transmitter electronics being capable of communicating with an external control loop; and a supercapacitor disposed within the internal compartment and connected to the transmitter electronics, wherein the supercapacitor is for storing energy generated by the manually operated power generator, and wherein the electrical energy stored in the supercapacitor powers the sensor.

14. The industrial process transmitter of claim 13 wherein the power generator is a DC generator.

15. The industrial process transmitter of claim 13 wherein the power generator is an electromagnetic generator.

16. The industrial process transmitter of claim 13 and further comprising:
a display for displaying an output of the sensor.

17. The industrial process transmitter of claim 13 and further comprising:
a support for connecting the housing to a source of the industrial process fluid.

18. The industrial process transmitter of claim 13 and further comprising:
a cap for accessing the internal compartment of the housing;
wherein the power generator is accessible in the internal compartment of the housing by removing the cap.

19. The industrial process transmitter of claim 18 wherein the power generator includes a foldaway crank handle that collapses into the housing.

20. The industrial process transmitter of claim 18 wherein the cap is threaded onto the housing with flame quenching channels.

21. The industrial process transmitter of claim 13 and further comprising:
a cap for accessing the internal compartment of the housing;
wherein the power generator is accessible through an opening in the cap.

22. The industrial process transmitter of claim 13 and further comprising:
an opening located on the housing for accessing the internal compartment of the housing; and
wherein the power generator includes a crank handle in communication with the power generator through the opening.

23. The industrial process transmitter of claim 13 wherein the modular generator housing connects to the terminal block power connector in a repeatably removable fashion.--